(12) United States Patent
Eskenazi

(10) Patent No.: US 7,752,045 B2
(45) Date of Patent: Jul. 6, 2010

(54) SYSTEMS AND METHODS FOR COMPARING SPEECH ELEMENTS

(75) Inventor: Maxine Eskenazi, Pittsburgh, PA (US)

(73) Assignees: Carnegie Mellon University, Pittsburgh, PA (US); Carnegie Speech Company, Inc., Pittsburgh, PA (US)

( * ) Notice: Subject to any disclaimer, the term of this patent is extended or adjusted under 35 U.S.C. 154(b) by 1494 days.

(21) Appl. No.: 10/265,862

(22) Filed: Oct. 7, 2002

(65) Prior Publication Data

US 2007/0192093 A1  Aug. 16, 2007

(51) Int. Cl.
*G06F 17/27* (2006.01)
*G10L 15/00* (2006.01)
*G10L 15/06* (2006.01)

(52) U.S. Cl. ............... 704/243; 704/9; 704/231; 704/236

(58) Field of Classification Search ........... 704/246, 704/277, 236, 243
See application file for complete search history.

(56) References Cited

U.S. PATENT DOCUMENTS

| | | | |
|---|---|---|---|
| 2,533,010 A | 12/1950 | Henabery | |
| 3,713,228 A | 1/1973 | Mason et al. | |
| 4,030,211 A | 6/1977 | McGinley | |
| 4,115,932 A | 9/1978 | Charlesworth | |
| 4,247,995 A | 2/1981 | Heinberg | |
| 4,270,284 A | 6/1981 | Skellings | |
| 4,333,152 A | 6/1982 | Best | |
| 4,406,626 A | 9/1983 | Anderson et al. | |
| 4,443,199 A | 4/1984 | Sakai | |
| 4,569,026 A | 2/1986 | Best | |
| 4,609,357 A | 9/1986 | Clegg | |
| 4,643,680 A | 2/1987 | Hill | |
| 4,655,713 A | 4/1987 | Weiss | |
| 4,681,548 A | 7/1987 | Lemelson | |
| 4,913,539 A | 4/1990 | Lewis | |
| 5,036,539 A | 7/1991 | Wrench, Jr. et al. | |
| 5,065,345 A | 11/1991 | Knowles et al. | |
| 5,142,657 A | 8/1992 | Ezawa et al. | |
| 5,197,883 A | 3/1993 | Johnston | |
| 5,255,925 A | 10/1993 | Small | |
| 5,268,990 A | 12/1993 | Cohen et al. | |
| 5,293,584 A | 3/1994 | Brown et al. | |
| 5,302,132 A | 4/1994 | Corder | |
| 5,306,153 A | 4/1994 | Foster | |
| 5,307,442 A | 4/1994 | Abe et al. | |

(Continued)

FOREIGN PATENT DOCUMENTS

DE    100 10 232 A1    10/2000

(Continued)

*Primary Examiner*—David R Hudspeth
*Assistant Examiner*—Justin W Rider
(74) *Attorney, Agent, or Firm*—Womble Carlyle Sandridge & Rice, PLLC

(57) ABSTRACT

A method for comparing a first audio data source with a plurality of audio data sources, wherein the first audio data source has an utterance spoken by a first person and the plurality of audio data sources have the same utterance spoken by a second person. The method includes performing a speech recognition function on the first audio data source to isolate at least one element of the first audio data source. The method also includes comparing the isolated element with a corresponding element in the plurality of audio data sources and determining whether the utterance spoken by the first person contained an error based on the comparison.

30 Claims, 2 Drawing Sheets

U.S. PATENT DOCUMENTS

| | | | |
|---|---|---|---|
| 5,315,689 A | 5/1994 | Kanazawa et al. | |
| 5,340,316 A | 8/1994 | Javkin et al. | |
| 5,357,596 A | 10/1994 | Takebayashi et al. | |
| 5,387,104 A | 2/1995 | Corder | |
| 5,393,236 A | 2/1995 | Blackmer et al. | |
| 5,421,731 A | 6/1995 | Walker | |
| 5,429,513 A | 7/1995 | Diaz-Plaza | |
| 5,458,494 A | 10/1995 | Krohn et al. | |
| 5,487,671 A * | 1/1996 | Shpiro et al. | 434/185 |
| 5,503,560 A * | 4/1996 | Stentiford | 434/167 |
| 5,524,169 A | 6/1996 | Cohen et al. | |
| 5,536,171 A | 7/1996 | Javkin et al. | |
| 5,540,589 A | 7/1996 | Waters | |
| 5,617,855 A | 4/1997 | Waletzky et al. | |
| 5,634,086 A | 5/1997 | Rtischev et al. | |
| 5,647,834 A | 7/1997 | Ron | |
| 5,649,826 A | 7/1997 | West et al. | |
| 5,679,001 A | 10/1997 | Russell et al. | |
| 5,692,906 A | 12/1997 | Corder | |
| 5,717,828 A * | 2/1998 | Rothenberg | 704/251 |
| 5,727,950 A | 3/1998 | Cook et al. | |
| 5,766,015 A | 6/1998 | Shpiro | |
| 5,810,599 A | 9/1998 | Bishop | |
| 5,832,441 A | 11/1998 | Aaron et al. | |
| 5,857,173 A | 1/1999 | Beard et al. | |
| 5,862,519 A * | 1/1999 | Sharma et al. | 704/231 |
| 5,863,208 A | 1/1999 | Ho et al. | |
| 5,870,709 A | 2/1999 | Bernstein | |
| 5,920,838 A | 7/1999 | Mostow et al. | |
| 5,927,988 A | 7/1999 | Jenkins et al. | |
| 5,934,909 A | 8/1999 | Ho et al. | |
| 6,006,188 A | 12/1999 | Bogdashevsky et al. | |
| 6,009,397 A | 12/1999 | Siegel | |
| 6,055,498 A * | 4/2000 | Neumeyer et al. | 704/246 |
| 6,077,085 A | 6/2000 | Parry et al. | |
| 6,126,447 A | 10/2000 | Engelbrite | |
| 6,134,529 A | 10/2000 | Rothenberg | |
| 6,146,147 A | 11/2000 | Wasowicz | |
| 6,151,577 A | 11/2000 | Braun | |
| 6,157,913 A | 12/2000 | Bernstein | |
| 6,272,464 B1 * | 8/2001 | Kiraz et al. | 704/257 |
| 6,571,208 B1 * | 5/2003 | Kuhn et al. | 704/250 |
| 2002/0160341 A1 | 10/2002 | Yamada et al. | |

FOREIGN PATENT DOCUMENTS

| | | |
|---|---|---|
| EP | 0 805 434 A2 | 4/1997 |
| EP | 1 089 246 A2 | 4/2001 |
| WO | WO 01/75862 A2 | 10/2001 |

* cited by examiner

US 7,752,045 B2

SYSTEMS AND METHODS FOR COMPARING SPEECH ELEMENTS

BACKGROUND

Various computer-assisted products exist that enable a person to learn a non-native language. In such products, a person speaks an utterance into a microphone and the products teach lexicon and syntax by giving the person a general idea of errors in pronunciation. Such products do not immediately pinpoint exact errors in pronunciation and thus do not typically provide useful feedback that the speaker needs to master a non-native language.

SUMMARY

In one embodiment, the present invention is directed to a method for comparing a first audio data source with a plurality of audio data sources, wherein the first audio data source has an utterance spoken by a first person and the plurality of audio data sources have the same utterance spoken by a second person. The method includes performing a speech recognition function on the first audio data source to isolate at least one element of the first audio data source. The method also includes comparing the isolated element with a corresponding element in the plurality of audio data sources and determining whether the utterance spoken by the first person contained an error based on the comparison.

In one embodiment, the present invention is directed to an apparatus. The apparatus includes an audio capture module for receiving a first spoken utterance, wherein the first spoken utterance is spoken in a language that is not native to a speaker of the first spoken utterance, and a comparison module for comparing an element of the first spoken utterance with a corresponding element in audio data from a plurality of audio data sources, wherein the audio data from a plurality of audio data sources are spoken in the language, wherein the language is native to each speaker of the audio data from a plurality of audio data sources, and wherein the first spoken utterance and the audio data from a plurality of audio data sources are substantially similar in content.

In one embodiment, the present invention is directed to a system. The system includes an audio input device and a comparison device in communication with the audio input device. The comparison device includes an audio capture module for receiving a first spoken utterance, wherein the first spoken utterance is spoken in a language that is not native to a speaker of the first spoken utterance and a comparison module for comparing an element of the first spoken utterance with a corresponding element in audio data from a plurality of audio data sources, wherein the audio data from a plurality of audio data sources are spoken in the language, wherein the language is native to each speaker of the audio data from a plurality of audio data sources, and wherein the first spoken utterance and the audio data from a plurality of audio data sources are substantially similar in content.

In one embodiment, the present invention is directed to an apparatus. The apparatus includes means for performing a speech recognition function on a first audio data source to isolate at least one element of the first audio data source, wherein the first audio data source has an utterance spoken by a first person. The apparatus also includes means for comparing the isolated element with a corresponding element in a plurality of audio data sources, wherein the plurality of audio data sources have the same utterance as that spoken by the first person that is spoken by a second person and means for determining whether the utterance spoken by the first person contained an error based on the comparison.

In one embodiment, the present invention is directed to a computer readable medium having stored thereon instructions which, when executed by a processor, cause the processor to perform a speech recognition function on a first audio data source to isolate at least one element of the first audio data source, wherein the first audio data source has an utterance spoken by a first person, compare the isolated element with a corresponding element in a plurality of audio data sources, wherein the plurality of audio data sources have the same utterance as that spoken by the first person that is spoken by a second person, and determine whether the utterance spoken by the first person contained an error based on the comparison.

BRIEF DESCRIPTION OF THE DRAWINGS

Further advantages of the present invention may be better understood by referring to the following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements such as, for example, various operating systems details and components. Those of ordinary skill in the art will recognize, however, that these and other elements may be desirable. However, because such elements are well known in the art, and because they do not facilitate a better understanding of the present invention, a discussion of such elements is not provided herein.

The present invention is directed generally and in various embodiments to systems and methods for comparing a first audio file with a second audio file to ascertain, or pinpoint, features of the first audio file. In one embodiment, the first audio file may be a word, phrase, sentence, etc. that is spoken by a first person in a language that is non-native to that person and the second audio file may be the same word, phrase, sentence, etc. that is spoken by a second person for whom the language is native.

Figure 1:
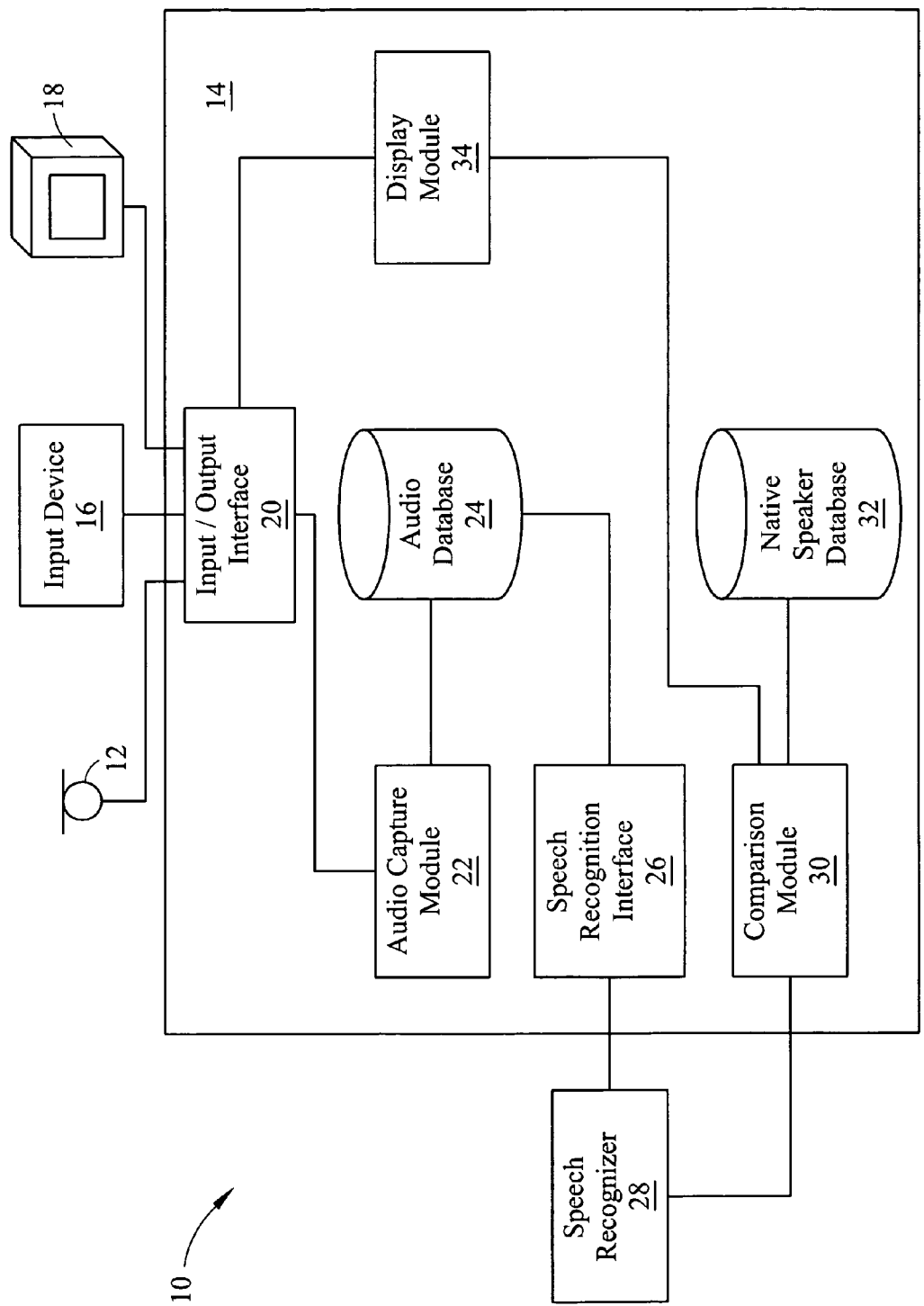
FIG. 1 is a diagram illustrating a system for comparing speech elements according to one embodiment of the present invention.

FIG. 1 is a diagram illustrating a system 10 for comparing speech elements according to one embodiment of the present invention. The system includes an audio input device 12, such as a microphone, into which a user of the system 10 can speak or otherwise input voice data to a comparison device 14. The voice data may be, for example, utterances such as, for example, spoken words, phrases, sentences, etc. The system 10 also includes an input device 16 such as, for example, a keyboard or a mouse, and a display 18 such as, for example, a computer or video screen or monitor. The audio input device 12, the input device 16, and the display 18 are in communication with the comparison device 14 via an input/output interface 20.

An audio capture module 22 captures audio data input from the audio input device 12 and stores the data in an audio database 24. The audio data may be stored in the database 24 in, for example, a digital audio format such as, for example, in .wav format. A speech recognition interface 26 transfers the audio data to a speech recognizer 28. The speech recognizer 28 may be any type of suitable speech recognizer such as, for example, the CMU Sphinx Open Source speech recognizer. The speech recognizer 28 translates the audio data signal into its component sounds (i.e. its phones) to determine the duration of each sound and to attach a score to each sound.

As described further hereinbelow in conjunction with FIG. 2, a comparison module 30 compares the sounds from the speech recognizer with those that are stored in a native speaker database 32. The native speaker database 32 contains speech data that correspond to words, phrases, sentences, etc. that are spoken in a language by a speaker whose native tongue is the language in which the words, phrases, sentences, etc. are spoken. The words, phrases, sentences, etc. correspond to those that were spoken by a user of the system 10 and thus input via the audio input device 12.

The comparison module 30 directs a display module 34 to output the results of the comparison to the display 18 so that the user of the system may view the results of the comparison.

Figure 2:
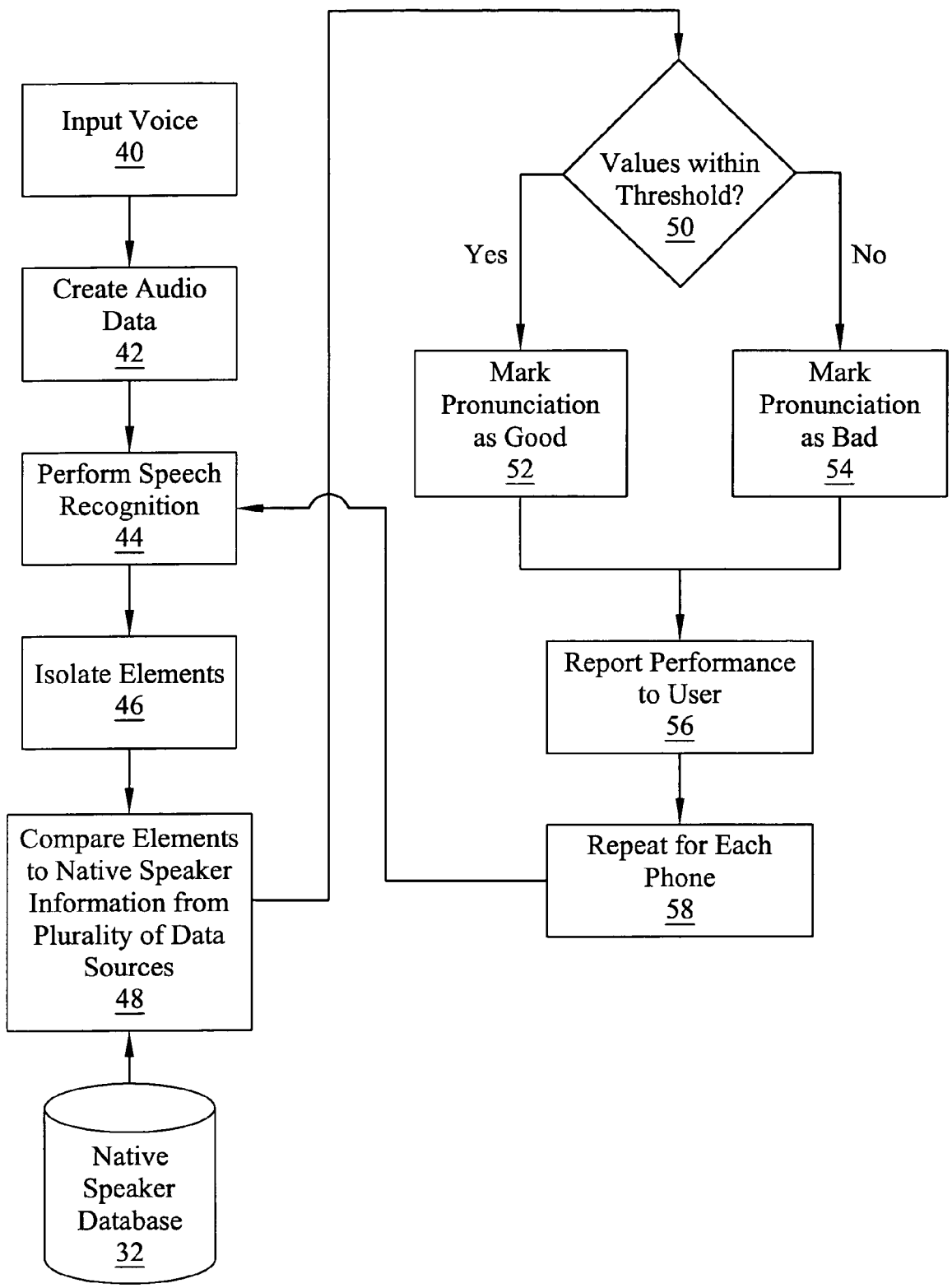
FIG. 2 is a flow diagram illustrating a process of comparing speech elements according to one embodiment of the present invention.

FIG. 2 is a flow diagram illustrating a process of comparing speech elements according to one embodiment of the present invention. At step 40, an audio signal representing the spoken voice of, for example, the user of the system 10 is input via, for example, the audio input device 12. For example, the user could signal that input is about to begin by pressing a key or button on the input device 16, speaking into the audio input device 12, and then signal when input is done by pressing a key or button on the input device 16. At step 42, the audio capture module 22 creates an audio data source, such as, for example, an audio file, an in-memory data structure, or other encoding, of the input signal to be stored in the audio database 24.

At step 44, the speech recognizer 28 performs speech recognition functions on each phone in the input audio data source. As an example, the speech recognizer could be operated in a forced alignment mode at step 44. In such a case, the orthographic text corresponding to the input audio signal is sent to the speech recognizer 28 along with the audio data source. The speech recognizer 28 outputs duration elements and recognition elements for each phone in the input audio data source.

At step 46, the comparison module 30 isolates each of the duration and recognition elements. At step 48, the comparison module 30 individually compares the duration and recognition elements that were isolated at step 46 with native speaker duration and recognition elements from a plurality of audio data sources, where the elements corresponding to the same phone that are stored in the native speaker database 32.

At step 50, the comparison module 30 determines whether the differences between both the duration and the recognition elements are within a threshold. Such a threshold could be, for example, based on the auditory confusability of this sound compared to the most proximate other sound in the language. If both of the values of the duration and recognition elements compare within their respective thresholds, the pronunciation of the phone is marked as "good" at step 52. If the value of either the duration or the recognition elements does not compare within their respective thresholds, the pronunciation of the phone is marked as "bad" at step 54.

At step 56, the display module 34 displays the performance of the user via the display 18 to the user. The performance of the user represents how well, in terms of duration and recognition, the user spoke the phone that was compared with that of at least one native speaker. The performance may be displayed by showing the correct utterance and the incorrect utterance to show the contrast in meaning between the utterances. At step 58, the process repeats for each phone in the audio input data source that was input to the speech recognizer 28.

In one embodiment of the present invention, the methods described herein are embodied in, for example, computer software code that is coded in any suitable programming language such as, for example, C, C++, or microcode. Such computer software code may be embodied in a computer readable medium or media such as, for example, a magnetic storage medium such as a floppy disk or an optical storage medium such as a CD-ROM. Furthermore, in one embodiment of the invention, the system 10 is implemented on any suitable computer such as, for example, a personal computer.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A method for comparing a first audio data source with a plurality of audio data sources, wherein the first audio data source has an utterance spoken by a first person and the plurality of audio data sources have the same utterance spoken a plurality of different times by a second person, the method comprising:
    performing a forced alignment speech recognition function on the first audio data source to isolate at least one element of the first audio data source, the forced alignment speech recognition function using an orthographic text corresponding to the first audio data source;
    comparing the isolated element with a corresponding element in the plurality of audio data sources; and
    determining whether the utterance spoken by the first person contained an error based on the comparison.

2. The method of claim 1, wherein comparing the isolated element includes comparing an isolated duration element to a corresponding duration element in the plurality of audio data sources.

3. The method of claim 1, wherein comparing the isolated element includes comparing an isolated recognition element to a corresponding recognition element in the plurality of audio data sources.

4. The method of claim 1, further comprising creating the first audio data source from an input voice signal.

5. The method of claim 1, wherein the utterance spoken by the first person is spoken in a non-native language and the utterance spoken by the second person is in spoken in the same language, wherein the language is native to the second person.

6. The method of claim 1, further comprising outputting an indication of one of a bad pronunciation of the utterance by the first person and a good pronunciation of the utterance by the first person.

7. An apparatus, comprising:
    an audio capture module for receiving a first spoken utterance, wherein the first spoken utterance is spoken in a language that is not native to a speaker of the first spoken utterance;
    a speech recognition module for performing a forced alignment speech recognition function on the first spoken utterance to isolate at least one element of the first spoken utterance, the forced alignment speech recognition function using an orthographic text corresponding to the first spoken utterance; and a comparison module for comparing the isolated element of the first spoken utterance with a corresponding element in audio data from a plurality of audio data sources and for determining whether the first spoken utterance contained an error based on the comparison, wherein the audio data from a plurality of audio data sources are spoken a plurality of different times in the language, wherein the language is native to each speaker of the audio data from a plurality of audio data sources, and wherein the first spoken utterance and the audio data from a plurality of audio data sources are substantially similar in content.

8. The apparatus of claim 7, further comprising an audio database for storing the first spoken utterance.

9. The apparatus of claim 7, further comprising a native speaker database for storing the audio data from a plurality of audio data sources.

10. The apparatus of claim 7, further comprising a display module in communication with the comparison module.

11. The apparatus of claim 7 further comprising speech recognition interface for interfacing with a speech recognizer.

12. A system, comprising:
an audio input device; and
a comparison device in communication with the audio input device, wherein the comparison device includes:
an audio capture module for receiving a first spoken utterance, wherein the first spoken utterance is spoken in a language that is not native to a speaker of the first spoken utterance;
a speech recognition module for performing a forced alignment speech recognition function on the first spoken utterance to isolate at least one element of the first spoken utterance, the forced alignment speech recognition function using an orthographic text corresponding to the first spoken utterance; and
a comparison module for comparing the isolated element of the first spoken utterance with a corresponding element in audio data from a plurality of audio data sources and for determining whether the first spoken utterance contained an error based on the comparison, wherein the audio data from a plurality of audio data sources are spoken a plurality of different times in the language, wherein the language is native to each speaker of the audio data from a plurality of audio data sources, and wherein the first spoken utterance and the audio data from a plurality of audio data sources are substantially similar in content.

13. The system of claim 12, further comprising a speech recognizer in communication with the comparison device.

14. The system of claim 12, further comprising: an input device; and a display device.

15. The system of claim 12, wherein the comparison device further comprises an audio database for storing the first spoken utterance.

16. The system of claim 12, wherein the comparison device further comprises a native speaker database for storing the audio data from a plurality of data sources.

17. The system of claim 12, wherein the comparison device further comprises a display module in communication with the comparison module.

18. The system of claim 12, wherein the comparison device further comprises a speech recognition interface in communication with the speech recognizer.

19. An apparatus, comprising:
means for performing a forced alignment speech recognition function on a first audio data source to isolate at least one element of the first audio data source, wherein the first audio data source has an utterance spoken by a first person, the means for performing the forced alignment speech recognition function using an orthographic text corresponding to the utterance spoken by the first person;
means for comparing the isolated element with a corresponding element in a plurality of audio data sources, wherein the plurality of audio data sources have an utterance substantially similar in content to the utterance spoken by the first person spoken a plurality of different times by a second person; and
means for determining whether the utterance spoken by the first person contained an error based on the comparison.

20. A computer readable medium having stored thereon instructions which, when executed by a processor, cause the processor to:
perform a forced alignment speech recognition function on a first audio data source to isolate at least one element of the first audio file, wherein the first audio data source has an utterance spoken by a first person, the forced alignment speech recognition function using an orthographic text corresponding to the first audio data source;
compare the isolated element with a corresponding element in a plurality of audio data sources, wherein the plurality of audio data sources have an utterance substantially similar in content to the utterance spoken by the first person spoken a plurality of different times by a second person; and
determine whether the utterance spoken by the first person contained an error based on the comparison.

21. The method of claim 1, further comprising sending the orthographic text to a speech recognizer.

22. The method of claim 1, wherein the plurality of audio data sources is comprised of the same utterance spoken a plurality of different times by a plurality of different persons.

23. The apparatus of claim 7, further comprising sending the orthographic text to a speech recognizer.

24. The apparatus of claim 7, wherein the plurality of audio data sources are spoken by a plurality of different persons.

25. The system of claim 12, further comprising sending the orthographic text to the speech recognizer.

26. The system of claim 12, wherein the plurality of audio data sources have the same utterance spoken a plurality of different times by a plurality of different persons.

27. The apparatus of claim 19, further comprising a speech recognizer, wherein the orthographic text is sent to the speech recognizer.

28. The apparatus of claim 19, wherein the plurality of audio data sources is comprised of an utterance substantially similar in content to the utterance spoken by the first person spoken by a plurality of different persons.

29. The computer readable medium of claim 20, further comprising instructions which, when executed by a processor, cause the processor to send the orthographic text to a speech recognizer.

30. The computer readable medium of claim 20, wherein the plurality of audio data sources is comprised of an utterance substantially similar in content to the utterance spoken a plurality of different times by a plurality of different persons.

* * * * *